United States Patent [19]

Allen et al.

[11] 3,989,435

[45] Nov. 2, 1976

[54] APPARATUS FOR FABRICATING SPHERICALLY SHAPED PARTICLES OF SMALL DIAMETER

[75] Inventors: Frederick M. Allen, Walworth; Anthony F. Lipani, Webster, both of N.Y.

[73] Assignee: Xerox Corporation, Stamford, Conn.

[22] Filed: Nov. 15, 1974

[21] Appl. No.: 524,014

[52] U.S. Cl. ................................ 425/222; 425/332; 425/DIG. 101; 51/164; 259/81 R; 209/260; 209/350

[51] Int. Cl.² ......................................... B29B 1/03

[58] Field of Search ........... 425/222, 332, DIG. 101; 51/164; 259/81 R; 264/15; 209/260, 309, 350, 361

[56] References Cited

UNITED STATES PATENTS

| | | | |
|---|---|---|---|
| 721,649 | 2/1903 | Pendleton | 51/164 |
| 1,291,371 | 1/1919 | Bell | 209/309 X |
| 3,109,808 | 11/1963 | Greenwell | 209/309 |
| 3,345,683 | 10/1967 | Eirich et al. | 209/361 X |
| 3,463,098 | 8/1969 | Gyde et al. | 425/332 X |
| 3,524,735 | 8/1970 | Oetiker | 51/164 |
| 3,529,043 | 9/1970 | Taylor et al. | 264/15 |
| 3,579,719 | 5/1971 | Moriya | 425/332 |
| 3,885,357 | 5/1975 | Hoyt | 51/164 X |
| R27,214 | 11/1971 | Nakahara | 264/15 |

FOREIGN PATENTS OR APPLICATIONS

| | | | |
|---|---|---|---|
| 5,064 | 6/1906 | United Kingdom | 259/81 |
| 548,355 | 10/1942 | United Kingdom | 51/164 |

*Primary Examiner*—Ronald J. Shore

[57] ABSTRACT

A method of forming spherically shaped pellets of relatively small diameter is disclosed which comprises the steps of depositing a finely divided congealable material on a surface of a disk shaped body, transporting the body over a closed course which extends in a plane forming an acute angle with the horizontal while rotating the body during the transport in the plane of the course thereby imparting a tumbling motion to the material and resulting in the fabrication of pellets, and collecting pellets of a predetermined range of sizes. A pelletizing apparatus is described which is adapted for forming pellets of relatively small diameter having enhanced surface characteristics and for automatically classifying the pellets by size.

8 Claims, 11 Drawing Figures

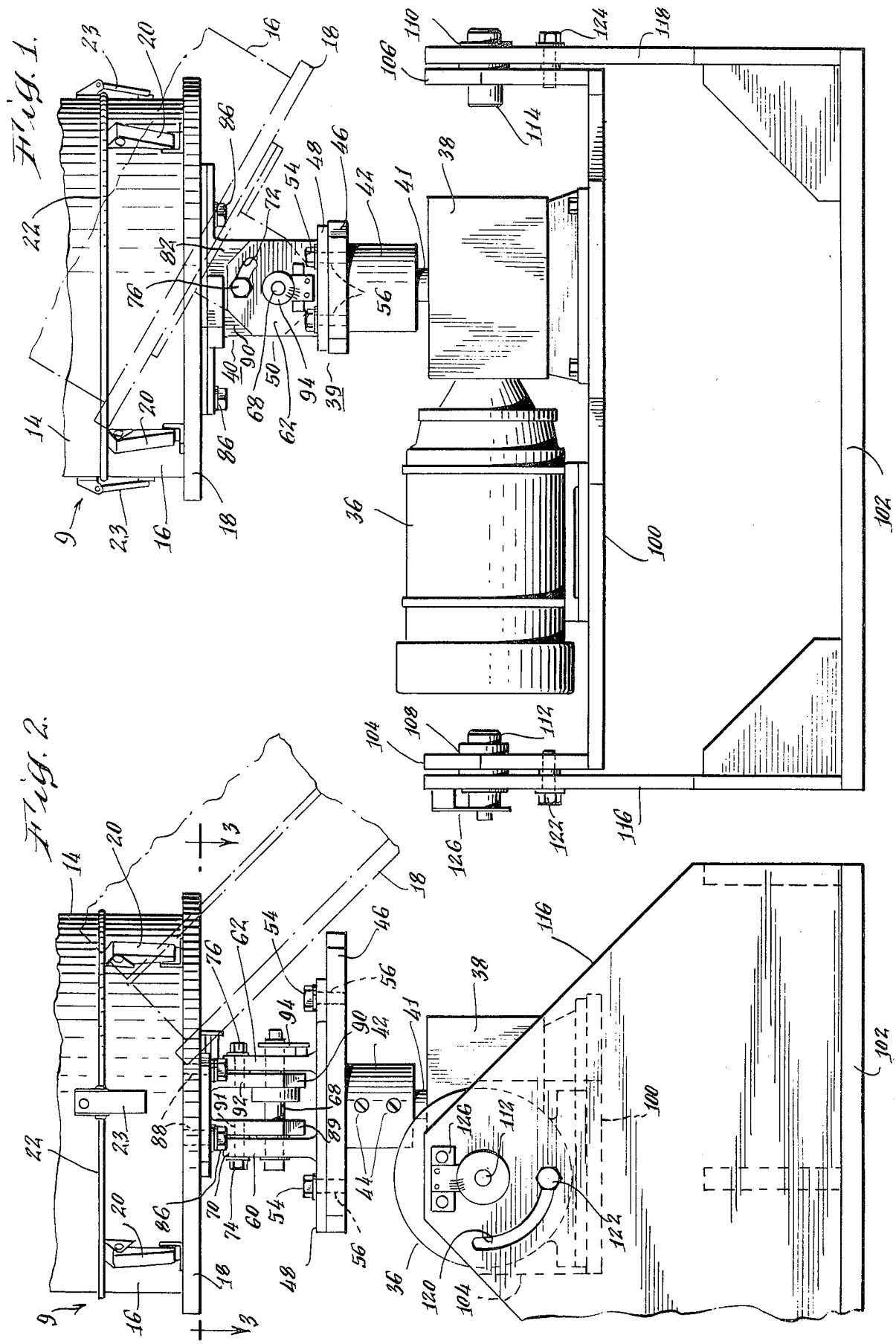

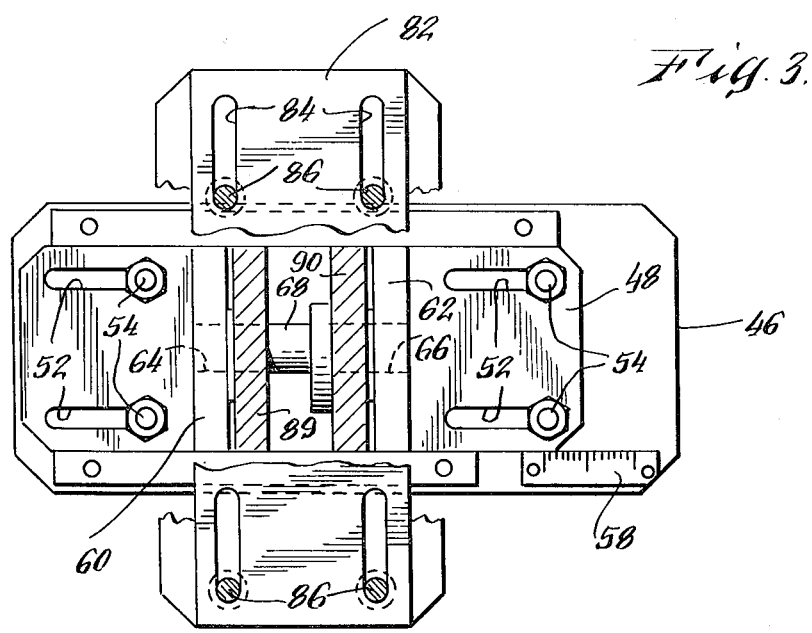
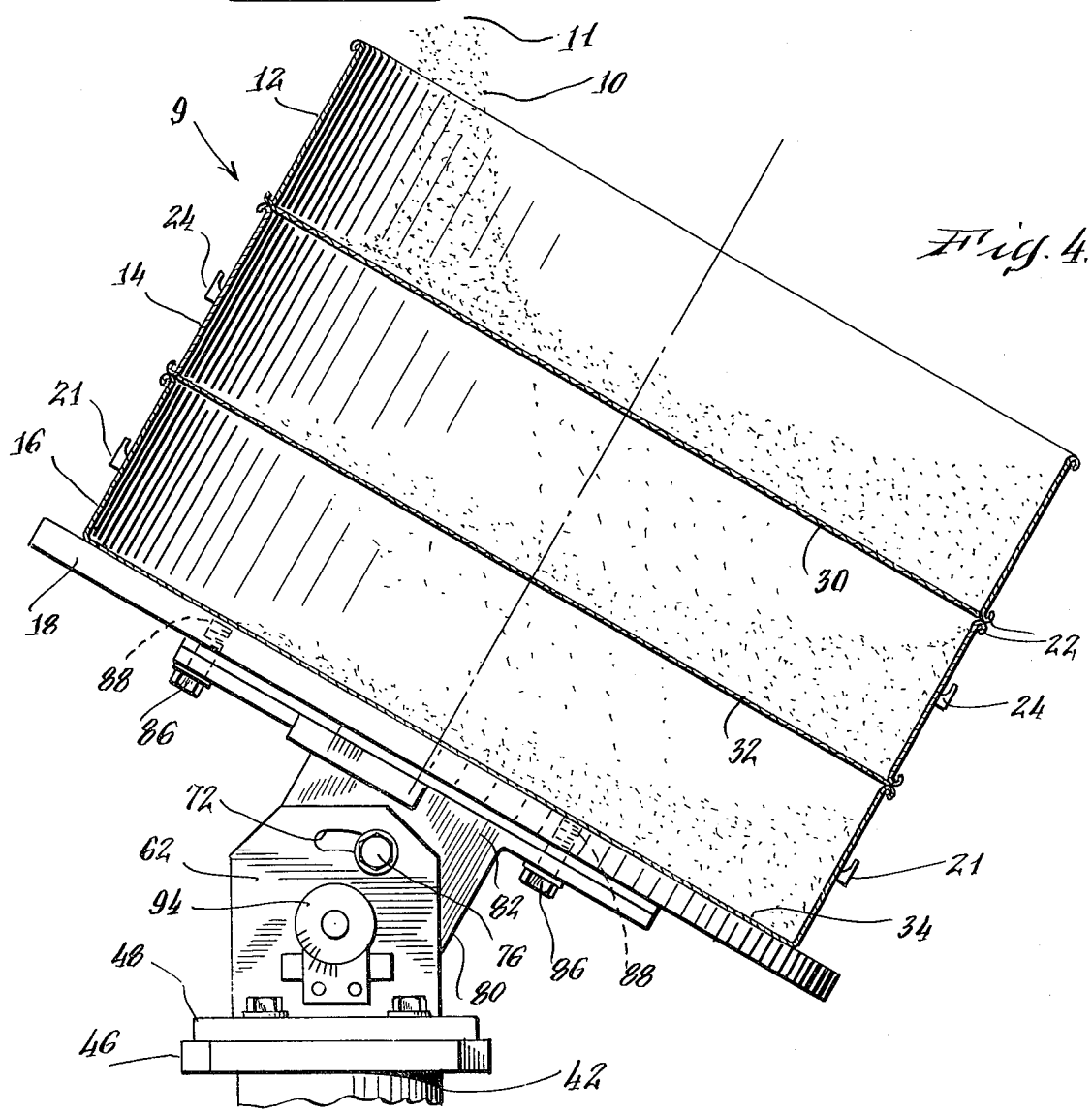

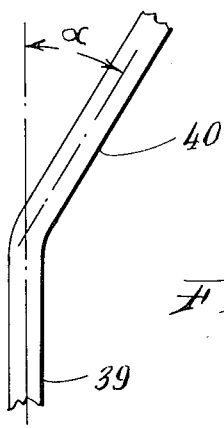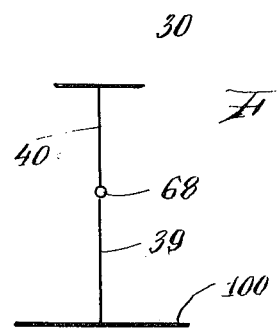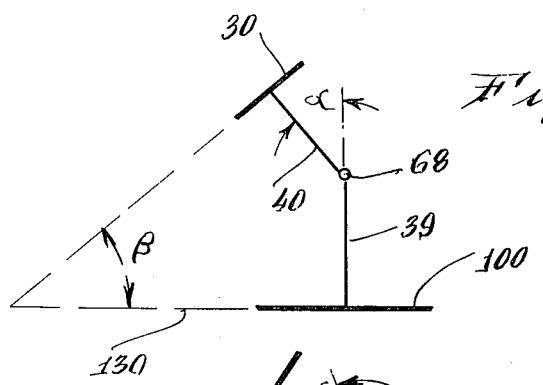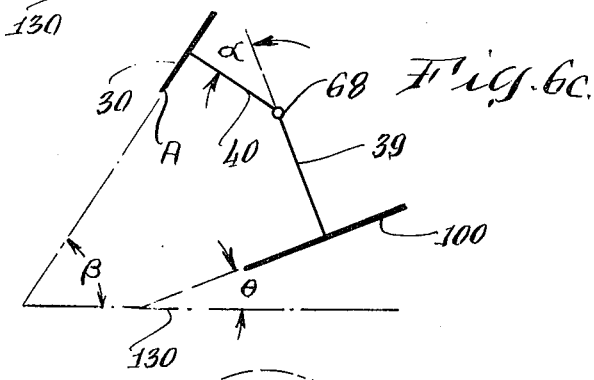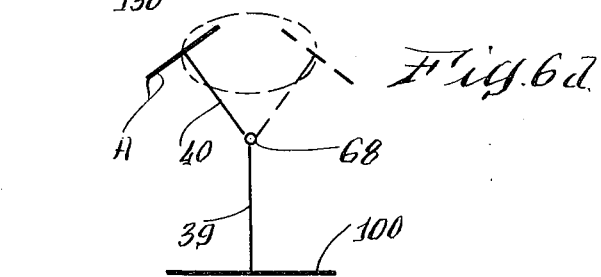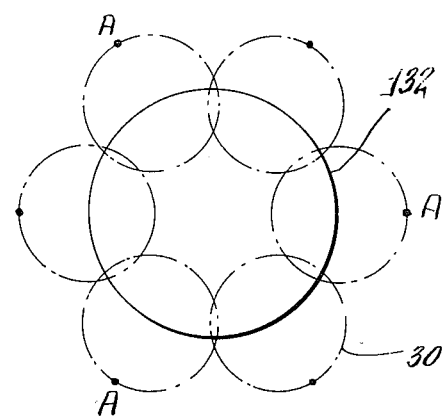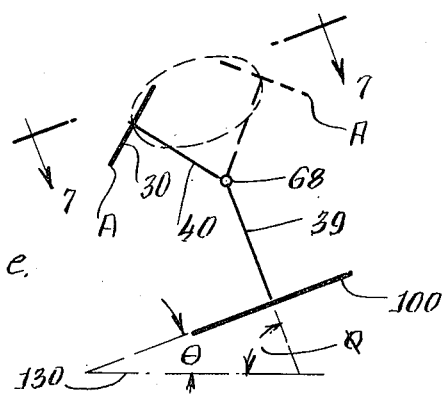

APPARATUS FOR FABRICATING SPHERICALLY SHAPED PARTICLES OF SMALL DIAMETER

The present invention relates generally to a method and apparatus for producing relatively small diameter spherically shaped particles. The invention relates more particularly to improvements in pelletizing disk techniques for the production of these particles.

Spherically shaped particles of relatively small diameter have various uses in industry. In particular, particles of this type are employed as a component of a mix for developing latent electrostatic images in an electrostatographic reproduction process. A developer mix comprises sherically shaped carrier particles having finely-divided toner particles electrostatically clinging to the surface of the carrier particles. This mix is conveyed to and rolled or cascaded across a latent electrostatic image-bearing surface. The composition of the toner particles is chosen so as to have a triboelectric polarity opposite that of the spherically shaped carrier particles. As the mixture cascades or rolls across the image-bearing surface, the toner particles are electrostatically deposited and secured to the charged portion of the latent image thereby developing the image. The developer image is then subsequently transferred and fixed to a record medium.

Fidelity in development and resulting copy quality are influenced to a large degree by the surface characteristics of the carrier particles. Degradation of copy quality occurs more readily when the carrier surfaces are irregular because peaks and valleys in the carrier surface provide seats into which the toner material undesirably becomes impacted.

Obtaining carrier particles of substantially uniform size and surface characteristic and within close dimensional tolerances has heretofore proved difficult and expensive. For example, in one known process capable of providing carrier particles in the 50 to 1,000 micron range, a water mixture including nickel oxide, zinc oxide or ferric oxide is blown through a nozzle to obtain green carrier particles. These particles, when collected, are intitially screened and crystallized with heat. In the screening process those particles which are of an undesired size are returned to the mixture. The crystallized particles are subsequently screened and coated with, for example, methyl terpolymer. The out-of-size crystallized particles screened constitute waste in the process. Microscopic analysis of the process has revealed that a significant portion of the particles produced are not spherical in that they include voids or are oblong.

Other techniques for mechanically producing spherically shaped particles are also known. These techniques provide for a tumbling or rolling action of a fine charge material in the presence of moisture and, when desired, a binding agent to produce spherically shaped pellets. One form of pelletizing apparatus of this nature comprises a cylindrical drum which accepts a feed at one end of the drum; tumbles the material through the length of the unit; and, discharges the product across a screen at an opposite end of the unit. This arrangement, however, requires that a pellet, once formed, progress through the entire drum length before discharging. Fines or relatively smaller sized particles are carried with it and the finished pellets are generally not uniform in size. A somewhat similar technique is provided by replacing the cylinder with a conical shaped drum which is closed at one end and which receives feed and a moisture spray from an opposite end and discharges the pellets formed from same end.

Another technique and to which the present invention is more particularly related, comprises the disk pelletizing process wherein an inclined disk is rotated about an axis thereof. The material is introduced to the rotating disk and is carried partly around and then rolls downward across the face of the disk. A pellet may make many passes in this way before it attains a size sufficiently large to discharge from the disk.

While known forms of the pelletizer represent an improvement over the drum arrangement, it is similarly characterized by the production of pellets which are not uniform in size and surface characteristics and generally cannot produce pellets smaller than about 300 micron in diameter.

Accordingly, it is an object of this invention to provide an improved method and apparatus for fabricating spherically shaped particles.

Another object of the invention is to provide an improved method and apparatus for fabricating spherically shaped particles in the range of 50 to 1,000 microns in diameter and having substantially uniform surface characteristics.

Another object of the invention is to provide an improved disk pelletizing method and apparatus.

A further object of the invention is to provide a disk pelletizing apparatus for both pelletizing and sieving particles of a desired size.

In accordance with the method of this invention, spherically shaped pellets of relatively small diameter are formed by the steps of depositing a finely divided congealable material on a surface of a disk shaped body, transporting the body over a closed course which extends in a plane forming an acute angle with the horizontal while rotating the body during the transport in the plane of the course thereby imparting a tumbling motion to the material and resulting in the fabrication of pellets, and collecting pellets of a predetermined range of sizes. A motion imparted to the disk through this method provides an enhanced and increased tumbling and rolling through movement of the material across the disk and results in an advantageous reduction in peaks and valleys on the surface of the particles thus produced.

A pelletizing apparatus constructed in accordance with features of the invention comprises a body having a surface thereof for receiving finely divided congealable material which is to be pelletized by tumbling movement of the material across the body under the influence of gravitational forces as the body is transported and means for transporting the body over a closed course which extends in a plane forming an acute angle with the horizontal and for simultaneously rotating the body in the plane. A preferred embodiment provides means for causing an axial location on the body to traverse a circular course in the plane and for rotating the body about its axis during transport. The surface is arranged for sieving pellets of a predetermined range of sizes.

In accordance with more particular features of the invention, a pelletizing apparatus for forming spherically shaped pellets by the coagulation of finely divided material supplied thereto and for sieving formed pellets to a desired size comprises a support means, a plurality of ring shaped bodies stacked in a tiered array having a longitudinal axis thereof, a plurality of sieve screens supported at spaced apart positions along the axis, a means for securing said support means, said array and said screens in a rigid assembly, and a means for rotating said assembly for causing material which is received by an uppermost screen of the assembly to coagulate or form spherically shaped particles which are sieved from the upper screen to an adjacent lower screen.

These and other objects and features of the invention will become apparent with reference to the following specification and to the drawings wherein:

FIG. 1 is a side elevational view of an apparatus for practicing the present invention;

FIG. 2 is an end view of the apparatus of FIG. 1;

FIG. 3 is an enlarged view taken along lines 3—3 of FIG. 2;

FIG. 4 is an enlarged sectional view of a portion of the apparatus of FIG. 1;

FIG. 5 is an enlarged view of a portion of an alternative drive arrangement employed with the apparatus of FIG. 1; and, FIGS. 6a through 6e and 7 are schematic diagrams which are useful in explaining the method and apparatus of the present invention.

Referring now to FIGS. 1–4 of the drawings, a pelletizing apparatus is shown to include an agitating and sieving assembly 9 for pelletizing material 10 which is supplied thereto. As best seen in FIG. 4, the material 10 is introduced by hand or alternatively by an automatic means from a location 11 above the assembly. The material comprises a fine powder, for example, which is adapted to coagulate upon agitation and tumbling and form pellets. The assembly 9 includes a plurality of annular bodies comprising the ring shaped bodies 12, 14, and 16 which are stacked in a tiered array. Alternatively, the body 16 may be bowl shaped to include a bottom surface thereof. These bodies are intercoupled and are demountably secured to a support means comprising a circular plate 18 to form a rigid, cylindrically shaped assembly having a longitudinal axis 19.

A plurality of clasps are provided for intercoupling and securing the ring shaped bodies and the plate 18. Clasps 20 are mounted to the plate and engage bosses 21 (FIG. 4) for mounting the member 16 to the plate 18. The bodies 12, 14, and 18 are formed of relatively thin walled sheet metal and the upper and lower edges of the body 14, the upper edge of the body 16, and the lower edge of the body 12 are flanged or folded over to provide a surface for contacting and positioning an adjacent body. The clasps 23 are secured to the ring shaped body 16 and engage the flanges 22 of the bodies 14 and 16 thereby rigidly intercoupling these bodies. Similarly, clasps are provided and engage bosses 24 on the outer wall of the bodies 14 and the flanges of the ring shaped bodies 12 and 14 to provide rigid intercoupling of these bodies.

A disk shaped body comprising a screen 30 is mounted to the assembly 9 at a first location along its longitudinal axis 19. The body 30 is a circular screen which is secured to an inner wall of the body 12 by welding or brazing. A surface of the screen receives the finely divided material 11 which, as explained hereinafter, causes agitation and tumbling of the material upon transport of the body 30 and coagulation and subsequent pelletizing of the material. The screen from which the body 30 is fabricated has a mesh size adapted for passing pellets within a predetermined range of diameters. These pellets and accompanying "fines" impinge upon a second disk shaped body 32 which also comprises a circular screen positioned at a second relatively lower longitudinal location in the assembly which is beneath the body 30. Pellets impinging upon the screen 32 and having a minimum predetermined diameter are contained by the screen and by the ring 14 while pellets and material of finer consistency pass through the screen 32 and deposit upon a surface 34 of the plate 18. Thus, finely divided material which is deposited on the screen 30 is formed into pellets which are automatically sized and deposited on a screen 32 while the "fines" are deposited on the surface 34. By releasing the clasps of the assembly, the pellets contained by the screen 32 and ring 14 can be removed as well as the "fines" which are deposited on the surface 34.

A means is provided for transporting the material supporting disk shaped body 30 over a course extending in a plane which forms an acute angle with a horizontal plane and for rotating the body during transit. For the purpose of this specification and the appended claims, the course is defined by the locus of the path traversed by any point on the body during its transport. The transport means includes an electrically energized motor 36 (FIG. 1) which is coupled through a gear reduction box 38 to a rotary drive means having rotary drive segments which are referenced generally as 39 and 40. The rotary drive segment 39 includes a drive shaft 41 which is rotated by the gear reduction box 38, a collar 42 positioned over the shaft 40 and secured thereto by bolts 44 for rotation therewith, a plate 46 welded to the collar for rotation therewith, and a yoke member 50 having integrally formed plate and upstanding bracket members 48, 60 and 62 respectively. As best seen in FIG. 3, the yoke plate member 48 includes a plurality of slots 52 through which mounting bolts 54 extend and engage threaded apertures 56 in the plate 46 (FIG. 2) thereby providing for adjustment of the relative positions of the plates 46 and 48. A scale 58 is mounted on the plate 46 for indicating the position of an edge of the plate 48 with respect to the plate 46. The yoke members 60 and 62 include apertures 64 and 66 respectively formed therein for receiving a pivotal through bolt 68. The members 60 and 62 further include slots 70 and 72 formed therein through which there extends locking bolts 74 and 76 respectively.

Rotary drive segment 40 comprises a yoke 80 (FIG. 4) having an integrally formed plate 82 and depending bracket members 89 and 90. A plurality of mounting slots 84 are formed in the thickness of the plate member 82 and mounting bolts 86 extend through these slots and engage threaded apertures 88 in the plate 18. The depending segments 89 and 90 include pivotal apertures formed therein and through which the pivotal bolt 68 extends. The yoke 80 can therefore be pivoted about the bolt 68. The depending yoke segments 89 and 90 further include threaded apertures 91 and 92 into which the locking bolts 74 and 76 extend and provide for locking the assembly at a desired angular orientation ($\alpha$, FIG. 6) with respect to the rotary drive segment 39. A vernier scale 94 (FIG. 4) is provided for indicating the angular relationship between a longitudinal axis of the rotary segment 40 and a longitudinal axis of the rotary segment 39.

The transport means further includes a support plate 100 which is pivotally mounted on a support frame 102. The plate 100 includes integral upstanding segments 104 and 106 having apertures 108 and 110, respectively, formed therein and through which pivot rods 112 and 114, respectively, extend. This pair of rods extends through aligned apertures in upstanding segments 116 and 118 of the frame 102. An arc shaped slot 120 is formed in the segment 116 and a similar arc shaped slot is formed in the segment 118. Locking bolts 122 and 124 extend through these slots and engage threaded apertures in the segments 104 and 106 thereby providing a means for locking the plate 100 at a desired angle with respect to a horizontal plane. An indicator 126 is provided for indicating the angle of the plate 100 with respect to a horizontal plane.

The motion of the assembly 9 and the body 30 which causes the tumbling action of the feed material and the coagulation of the material into pellets will best be explained with reference to FIGS. 6 and 7. FIG. 6 is a simplified schematic arrangement wherein the members 30 and 100 described hereinbefore are shown by lines representative of the plane of the body extending out of the paper while the rotary drive segments 39 and 40 are shown as lines representative of the longitudinal axis of these bodies. The pivotal coupling which is provided between the yoke members is represented by the pivot pin 68. The pelletizing motion in accordance with a feature of this invention, is illustrated by FIGS. 6C and 6E. This motion is best described and developed by first considering the arrangement of apparatus members as illustrated in FIG. 6A wherein the axes of the members 39 and 40 are aligned and vertically orientated while the bodies 30 and 100 extend in a horizontal plane. Rotation of member 39, aside from inertial effects upon acceleration will not provide a tumbling action of the material. The body 30 experiences only a rotary motion and since the material which is deposited on a surface of the body 30 remains in substantially the same vertical plane, gravitational potential forces for acting on the material are not created as a result of this motion.

In FIG. 6B, an axis of the rotary drive segment 39 remains vertically orientated while an axis of the rotary drive segment 40 is positioned at an angle $\alpha$ with respect to the axis of the drive segment 39. The plane of the body 30 now forms an acute angle $\beta$ with the horizontal plane 130. As the rotary drive segment 39 is rotated, a longitudinal axis of the drive segment 40 will describe a conical surface of revolution with an apex at the pin 68 as is illustrated in FIG. 6D. The body 30 now experiences a linear motion about the apex 68. However, the body 30 maintains the same angular orientation with respect to the horizontal, and gravitational potential forces do not act on the material as a result of this motion. Material which is deposited on the body 30, aside from inertial motion upon acceleration, will remain stationary on the body and will be transported therewith without tumbling motion.

The arrangement of FIG. 6C however, differs from that of 6B in that the plate 100 is elevated at an acute angle $\theta$ with respect to the horizontal plane 130 and a longitudinal axis of the conical surface of revolution which is coincident with the longitudinal axis of the rotary drive 39 also forms an acute angle $\phi$ with the horizontal plane 130. As a result, the body 30 experiences linear and rotary motion and, in addition a rise and recession in elevation. Gravitational potential forces are thereby imparted to the body 30. FIG. 6E illustrates a conical surface of revolution formed by a longitudinal axis of the rotary drive means 39 under these conditions.

FIG. 7 is a view taken along line 7—7 of FIG. 6 illustrating the rotary motion of the body 30 during one revolution of the rotary drive segment 39. The longitudinal axis of the drive segment 39 and the centrally located axis 19 of the assembly 9 is transported over an annular course comprising a circle 132 as illustrated. The diameter of this circular course is determined by the magnitude of the angle $\alpha$ and the length of the rotary segment 40. During this transport, a point A on the body is rotated about the central axis of the body 30 so that upon the completion of one revolution by the rotary drive segment 39, the point A has rotated one complete revolution about a longitudinal axis of the body 30 while the body 30 has experienced an oscillation in a vertical direction. The oscillation and the rotation of the body 30 imparts a tumbling motion to material deposited on the body which enhances pelletizing and the surface characteristics of the pellets.

Although the pelletizing apparatus of FIGS. 1 through 4 includes rotary drive segments 39 and 40 adapted to be adjustable, a drive shaft wherein these components are integrally formed is alternatively provided. FIG. 5 illustrates such a shaft wherein an acute angle $\alpha$ is formed between the segments 39 and 40 of the shaft.

In a particular arrangement which has provided an enhanced pelletizing effect, the angle $\alpha$ has a value of greater than 0° and equal to or less than about 3°, the angle $\theta$ has a value of between about 35° and 55° and the rotary drive segment 39 is rotated at a rate of about 60 RPM. Material which is charged to the body 30 is provided as a fine dry powder. A single powdered material or a mixture of different powdered materials can be used and can include metal oxides, metals and organic solids.

An improved pelletizing method and apparatus has thus been described which forms relatively small pellets and which automatically classifies the formed pellets as to size. The method and apparatus are advantageous in that the pellets have substantially uniform surface characteristics.

While there has been described a particular embodiment of the present invention, it will be appreciated by those skilled in the art that various modifications may be made thereto without departing from the spirit of the invention and the scope of the appended claims.

What is claimed is:
1. A pelletizing apparatus comprising:
 a body having a surface thereof for receiving finely divided material which is to be pelletized by movement of said material across said surface under the influence of gravitational forces as said body is transported, said body having a longitudinal axis thereof, and,
 means for transporting said body for causing an axial location on said body to traverse a circular course which extends in a plane, said plane forming an acute angle with the horizontal and for simultaneously rotating said body about said axis in said plane during transport, and for causing the movement of said longitudinal axis to define a conical surface of revolution, a longitudinal axis of said conical surface of revolution forming an acute angle with the horizontal.
2. The apparatus of claim 1 wherein said transport means includes a rotary drive means having a first drive member, said first member having a longitudinal axis thereof, means for causing rotation of said first member about its longitudinal axis, a second drive member also having a longitudinal axis thereof, said longitudinal axes of said first and second members forming an angle obtuse therebetween, and means for supporting said body at a distal segment of said second member for rotation therewith.

3. The apparatus of claim 2 wherein the longitudinal axis of said first member forms an acute angle with respect to a horizontal plane.

4. The apparatus of claim 3 wherein said first member is supported on a mounting surface and means are provided for varying the position of said surface with respect to a horizontal plane.

5. The apparatus of claim 4 wherein said first member comprises a drive shaft, and an electrically energized rotary drive means is supported on said mounting surface.

6. The apparatus of claim 5 wherein said first and second drive members are integrally formed.

7. The apparatus of claim 2 including adjustable means for varying the obtuse angle between the longitudinal axes of said first and second members.

8. A pelletizing apparatus, comprising:
a body having a first surface, adapted to pass particles smaller than a predetermined size, for receiving finely divided material which is to be pelletized by movement of said material across said surface under the influence of gravitational forces as said body is transported, said body having a longitudinal axis thereof;
a second surface positioned for receiving particles which pass through said first surface, said second surface being adapted for passing particles of a smaller predetermined size than said first surface; and
means for transporting said body for causing an axial location on said body to traverse a circular course which extends in a plane, said plane forming an acute angle with the horizontal and for simultaneously rotating said body about said axis in said plane during transport.

* * * * *